Patented Mar. 17, 1953

2,631,975

UNITED STATES PATENT OFFICE 2,631,975

PHOTOPOLYMERIZATION OF VINYL TRIFLUOROCHLOROETHYL ETHER

Julian Keith Lawson, Jr., Chester, Pa., assignor to American Viscose Corporation, Wilmington, Del., a corporation of Delaware No Drawing. Application January 8, 1947, Serial No. 720,928

4 Claims. (Cl. 204—158)

This invention relates to polymers of vinyl fluoroethyl ethers containing at least three fluorine atoms attached to the ethyl group, of which at least one fluorine atom is attached to the alpha carbon atom.

I have found that valuable polymerization products are obtained by polymerizing the vinyl fluoroethyl ethers, by the emulsion polymerization process and in the presence of ultraviolet irradiation. Copolymers may also be obtained by a similar method from mixtures of the vinyl fluoroethyl ethers and other polymerizable compounds containing the grouping $$CX_2=CX'X^2$$

in which X may be hydrogen or halogen, X' may be hydrogen, halogen, or a lower alkyl radical, and $X^2$ may be hydrogen, halogen, a lower alkyl radical, or the $CH_3COO-$ group, X' being hydrogen when $X^2$ is the $CH_3COO-$ group. Examples of such other polymerizable compounds are the mono-olefines, for instance, isobutylene, halogen-substituted mono-olefines, for instance trifluorochloroethylene, and vinyl acetate or the like.

The final polymerization products are insoluble in water, and variously soluble in most common organic solvents. For the most part, the polymerization products are insoluble or only slightly soluble in the organic solvents. However, some of the polymers of the vinyl fluoroethyl ethers per se are soluble in acetone and, to a lesser extent, in hot methanol. Some of the copolymers of the ether and vinyl acetate are soluble in acetone, but such copolymers have also been prepared, under the conditions described, which are swollen in acetone, as well as in methyl ethyl ketone and pyridine, but not soluble in those solvents.

The new polymerization products may be melt-spun to form fibers, or they may be used in the preparation of films, coatings, priming compositions, and the like.

The monomeric vinyl polyfluoroethyl ethers may be obtained by reacting ethylene glycol with a fluorinated ethylene containing at least three fluorine atoms in the presence of a basic catalyst, to obtain the corresponding polyfluorinated ethyl ether by direct addition of the ethylene glycol to the double bond of the fluorinated ethylene, replacing the remaining hydroxyl group in the adduct by iodine, followed by dehydrohalogenation of the iodo-ether to obtain the vinyl polyfluorinated ether.

The invention is illustrated by the following examples in which the parts are given by weight.

Example I 500 parts of freshly distilled ethylene glycol were placed in a 3-necked vessel and warmed to 65° C. 11.5 parts of metallic sodium were dissolved in the glycol, the temperature being maintained at 90° C. or below.

Gaseous trifluorochloroethylene was bubbled into the solution of ethylene glycol at 80–85° C., for a period of 4 hours, with violent stirring. About 133 parts of the gas were absorbed. After about 12 hours, 150 parts of fresh ethylene glycol containing about 11 parts of dissolved sodium were added and additional trifluorochloroethylene gas was passed in. After about two hours, absorption slowed down and addition of the gas was terminated. A total of about 204 parts of gas was absorbed.

The pale yellow reaction mixture, which contained some suspended white salts, was diluted with water and some glacial acetic acid. A liquid layer separated below the water, but was not removed. The whole mixture was then extracted successively with four portions of ether, each consisting of 500 parts. The ether extracts were combined, dried over anhydrous potassium carbonate, and filtered. The drying agent was shaken with 250 parts of fresh ether, which was then filtered into the original filtrate. The ether was distilled off at atmospheric pressure, up to a bath temperature of 100° C., and the residue was distilled at 19 mm. About 226 parts of a water-white, pleasant-smelling liquid was obtained. It boiled at 80.5–87° C. at 19 mm. pressure. Most of the liquid boiled at 82–85° C.

The residue remaining in the distillation vessel was distilled at 19 mm. until the vapor temperature was 95–96° C. The distillate was redistilled and the portion boiling at 81–85° C. at 19 mm. was collected and added to the original distillate, to give a total yield of the liquid boiling at 80.5–87° C. of 236 parts. The product was ethylene glycol mono-trifluorochloroethyl ether of formula $CFClHCF_2OCH_2CH_2OH$ as proved by analysis.

Calc'd. for $C_4H_6O_2F_3Cl$: Cl—19.87
Found: Cl—19.77
$N_D^{25}=1.3808$; $d_{20}^{25}=1.456$ 150 parts of the ethylene glycol mono-trifluorochloroethyl ether, together with nine parts of red phosphorous were placed in a 3-necked vessel provided with an all-glass stirrer, a short reflux condenser, and an insert thermometer, in an ice bath. The contents of the vessel were stirred until thoroughly chilled, after which 110 parts of iodine were added. The whole mixture was stirred in the ice bath for 5 hours, after which it was heated to 100° C. for two hours, during which rapid evolution of hydrogen iodide took place. The mixture was cooled and rinsed out of the vessel with 200 parts of methylene chloride. Excess red phosphorous was removed by filtration, and the filtrate was shaken with dilute sodium hydroxide solution to remove excess iodine. An additional 200 parts of methylene chloride were added, and the solution was washed twice with saturated sodium chloride solution. The organic layer was separated, dried for about 12 hours over calcium chloride, filtered, and distilled. After removal of volatile solvent, about 139.5 parts of trifluorochloroethoxyethyl iodide ($CFClHCF_2OCH_2CH_2I$) were obtained, B. P. 93–103° C. at 36–38 mm. pressure.

Analysis:
Calculated for $C_4H_5OF_3ClI$: F, 19.77
Found: F, 20.28

125 parts of the trifluorochloroethoxyethyl iodide were added to an intimate mixture of 86.5 parts powdered solid sodium hydroxide and 86.5 parts of soda lime in a stoppered flask. The flask was attached to a short packed distilling column and heated in an oil bath. The reaction was started at a bath temperature of 140–150° C., and completed at 170–180° C. The temperature at the still-head attached to the column varied from 55 to 90° C. About 46 parts of a crude moist material distilled over through the column. It was dried over calcium chloride, filtered, and distilled through a short fractionating column. About 32.6 parts of vinyl trifluorochloroethyl ether ($CFClHCF_2OCH=CH_2$) were obtained, B. P. 71–74° C., atmospheric pressure.

Analysis:
Calc'd. for $C_4H_4OF_3Cl$: Cl=22.1
Found: Cl=21.07; 21.95

A Pyrex glass polymerization vessel was charged with 30 parts of a 3% solution of Gardinol WA (a commercial product comprising essentially sodium lauryl sulfate) containing 0.1% of dissolved uranyl nitrate as photosensitizer, 5.8 parts of the monomeric vinyl trifluorochloroethyl ether, and a small quantity of lead tetraethyl and of t-butyl hydroperoxide. The vessel was cooled to −78° C. in a bath of chloroform and carbon tetrachloride containing Dry Ice, and sealed under vacuum. After warming up to room temperature, the vessel was tumbled on a wheel and exposed to ultraviolet light for 160 hours. Polymer formation was apparent. The vessel was then opened, frozen in Dry Ice to break any emulsion present, again warmed, and the contents were mixed with 100 parts of saturated sodium chloride solution to precipitate the polymer. The crude precipitate was filtered off with suction, and washed thoroughly with water. The residue, comprising the polymer was then dried at 60° C. under 7 mm. pressure for 3 hours. The product was then melted, and the melt was extruded at a temperature of 140° C. to form fibers.

*Example II*

15 parts of a 3% solution of Gardinol WA (a commercial product comprising essentially sodium lauryl sulfate) containing 0.1% dissolved uranyl nitrate, 5 drops each of lead tetraethyl and tertiary butyl hydroperoxide, 3.1 parts of vinyl acetate, and 5.8 parts of monomeric vinyl trifluorochloroethyl ether were placed in a glass vessel. The vessel was cooled to −78°, evacuated, and sealed.

After warming to room temperature, the vessel was tumbled on a wheel exposed to ultraviolet light for 135 hours. The vessel was then opened, the polymer was washed with strong sodium chloride solution, dissolved in acetone, and reprecipitated into water. After drying, 5.6 parts of a vinyl-trifluorochloroethyl ether-vinyl acetate copolymer were obtained.

Instead of trifluorochloroethylene, other polyfluoroethylenes containing at least three fluorine atoms may be reacted with ethylene glycol to produce ethers, which after conversion to the corresponding vinyl ether may be polymerized in the manner described, for example, tetrafluoro ethylene, trifluoroethylene, and trifluorobromoethylene.

As variations and modifications may be made in carrying out the processes illustrated, without departing from the spirit and scope of the invention, it is to be understood that the invention is not to be limited to the specific embodiments thereof except as defined by the appended claims.

I claim:

1. The method for producing a polymeric material from monomeric polymerizable materials selected from the group consisting of vinyl trifluorochlorethyl ether and mixtures of vinyl trifluorochlorethyl ether with at least one other substance having the general formula $$CX_2=CX'X^2$$

in which X is selected from the group consisting of hydrogen and halogen, and X' and $X^2$ are selected from the group consisting of hydrogen, halogen, and lower alkyl radicals, which comprises mixing the monomeric polymerizable material with a photosensitizer, a polymerization catalyst, and an emulsifying agent to produce an emulsion, and then subjecting the emulsion to actinic radiation until polymerization is effected.

2. The method of claim 1, wherein the monomeric polymerizable material is vinyl trifluorochloroethyl ether.

3. The method of claim 1, wherein the monomeric polymerizable material is mixed with uranyl nitrate as photosensitizer, a mixture of lead tetraethyl and t-butyl hydroperoxide as catalyst, and sodium lauryl sulfate as emulsifying agent to produce an emulsion, and the emulsion thus produced is then subjected to actinic radiation until polymerization is effected.

4. The method of producing a homopolymer of vinyl trifluorochloroethyl ether which comprises mixing the monomeric ether with uranyl nitrate as photosensitizer, a mixture of lead tetraethyl and t-butyl hydroperoxide as catalyst, and sodium lauryl sulfate as emulsifying agent to produce an emulsion, and then subjecting the emulsion thus produced to actinic radiation until polymerization is effected.

JULIAN KEITH LAWSON, Jr.

REFERENCES CITED

The following references are of record in the file of this patent:

UNITED STATES PATENTS

| Number | Name | Date |
|---|---|---|
| 2,160,943 | Britton et al. | June 6, 1939 |
| 2,188,778 | Reppe | Jan. 30, 1940 |
| 2,273,891 | Pollack et al. | Feb. 24, 1942 |
| 2,326,736 | Adelson | Aug. 17, 1943 |
| 2,392,378 | Hanford | Jan. 8, 1946 |
| 2,393,967 | Brubaker | Feb. 5, 1946 |
| 2,409,274 | Hanford et al. | Oct. 15, 1946 |
| 2,436,144 | Howk et al. | Feb. 17, 1948 |